United States Patent
Zheng et al.

(10) Patent No.: US 7,512,305 B2
(45) Date of Patent: Mar. 31, 2009

(54) PRECISION OPTICAL FIBER CLAMP

(75) Inventors: Bing Zheng, Sunnyvale, CA (US); David F. Arnone, Mountain View, CA (US)

(73) Assignee: Bookham Technology plc, Northamptonshire (GB)

( * ) Notice: Subject to any disclaimer, the term of this patent is extended or adjusted under 35 U.S.C. 154(b) by 0 days.

(21) Appl. No.: 11/657,873

(22) Filed: Jan. 25, 2007

(65) Prior Publication Data

US 2007/0183733 A1 Aug. 9, 2007

Related U.S. Application Data

(60) Provisional application No. 60/771,821, filed on Feb. 8, 2006.

(51) Int. Cl.
G02B 6/00 (2006.01)
(52) U.S. Cl. .................................. 385/136; 385/137
(58) Field of Classification Search ................. None
See application file for complete search history.

(56) References Cited

U.S. PATENT DOCUMENTS

| 4,432,602 | A | * | 2/1984 | Margolin | 385/137 |
| 4,662,710 | A | * | 5/1987 | ten Berge | 225/2 |
| 4,755,018 | A | | 7/1988 | Heng et al. | |
| 4,756,518 | A | | 7/1988 | Varin et al. | |
| 4,871,227 | A | | 10/1989 | Tilse | |
| 5,835,652 | A | * | 11/1998 | Yagi et al. | 385/87 |
| 5,961,849 | A | * | 10/1999 | Bostock et al. | 216/24 |
| 6,431,763 | B1 | | 8/2002 | Sherman et al. | |
| 2004/0052447 | A1 | | 3/2004 | Tamura | |

FOREIGN PATENT DOCUMENTS

| EP | 90724 A1 * | 10/1983 |
| EP | 0 224 806 A1 | 6/1987 |
| EP | 1 387 196 A1 | 2/2004 |
| FR | 2 593 294 | 7/1987 |
| GB | 2 381 325 A | 4/2003 |
| JP | 56077814 | 6/1981 |
| JP | 07230017 A * | 8/1995 |

OTHER PUBLICATIONS

Search Report for European Application No. 07250506.8 (related to the present application), Jun. 6, 2007.
Drawings of a Monet fiber clamp. The Monent clamp features a circular hole to hold the fiber. The diameter of the circular hole can be adjusted so that the Monet fiber clamp can clamp the fiber. The applicants admit that this is prior art.

* cited by examiner

*Primary Examiner*—Omar Rojas
(74) *Attorney, Agent, or Firm*—Roeder & Broder LLP

(57) ABSTRACT

A fiber clamp (220) for clamping an optical fiber (16) includes a first clamp section (228) and a second clamp section (230) that flexibly urges the optical fiber (16) against the first clamp section (228). The second clamp section (230) can include a retainer housing (244) and a pair of spaced apart flexible members (246) that extend from the retainer housing (244). The flexible members (246) flexibly urge the optical fiber (16) against the first clamp section (228). A fastener assembly (232) can be used to urge the clamp sections (228) (230) directly together.

22 Claims, 4 Drawing Sheets

PRECISION OPTICAL FIBER CLAMP

RELATED APPLICATION

This application claims priority on Provisional Application Ser. No. 60/771,821 filed on Feb. 8, 2006 and entitled "PRECISION OPTICAL FIBER CLAMP". As far as is permitted, the contents of Provisional Application Ser. No. 60/771,821 are incorporated herein by reference.

BACKGROUND

Optical collimators are used to collect or direct an energy beam for optical communication, scientific instruments and other instruments. One type of optical collimator includes an optical element, an optical fiber, and a fiber clamp that retains a distal fiber end of the optical fiber. One type of fiber clamp circumferentially grips and retains the distal fiber end. Unfortunately, with this type of fiber clamp, the mechanical stress magnitude and field created in the fiber tip by locking the fiber clamp are relatively high, asymmetrical, and non-repeatable. Further, the polarization of an optical signal propagated through the optical fiber can be altered by changing the stress field in the fiber. The asymmetry and non-repeatability of the fiber clamp can cause unpredictable changes in the polarization of the optical fiber.

SUMMARY

The present invention is directed to a fiber clamp for clamping an optical fiber assembly. The fiber clamp includes a first clamp section and a second clamp section that flexibly urges the optical fiber assembly against the first clamp section. In one embodiment, the second clamp section includes a retainer housing and a flexible member that extends from the retainer housing. In this embodiment, the flexible member engages the optical fiber assembly and flexibly urges the optical fiber assembly against the clamp base. In another embodiment, the clamp retainer includes a pair of spaced apart flexible members that extend from the retainer housing. In this embodiment, the flexible members engage the optical fiber assembly and flexibly urge the optical fiber assembly against the clamp base.

In certain embodiments, the first clamp section includes a groove for receiving a portion of the optical fiber assembly. Further, the groove can be somewhat vee shaped. Moreover, the first clamp section can engage the optical fiber assembly at two spaced apart locations and the second clamp section can engage the optical fiber assembly at two spaced apart locations. Alternatively, the first clamp section can engage the optical fiber assembly at two spaced apart locations and the second clamp section can engage the optical fiber assembly at one location.

With the designs provided herein, in certain embodiments, the fiber clamp applies a repeatable, regulated, symmetrical, substantially uniform, controlled, and consistent pressure to the optical fiber. Further, in certain embodiments, the fiber clamp imparts a plurality of spaced apart, substantially radially directed forces on the optical fiber assembly. Moreover, the radially directed forces can be symmetrically oriented.

Additionally, in one embodiment, the optical clamp is shaped to provide controlled force magnitude and direction, even if the optical fiber assembly is irregular in shape. As a result thereof, the polarization of the optical signal in the optical fiber assembly is not significantly influenced. Stated in another fashion, a polarization extinction ratio ("PER") of the optical fiber assembly has a relatively small change when the optical clamp is attached to the optical fiber assembly. Further, the design provided herein is relatively easy to manufacture and assemble.

Additionally, the fiber clamp can include a fastener assembly that urges the clamp sections together. With the present design, any variation in applied torque to the fastener assembly does not directly vary the applied clamp force.

Moreover, the present invention is directed to a precision apparatus that includes an optical element and the fiber clamp. Further, the present invention is directed to a method for clamping an optical fiber assembly.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
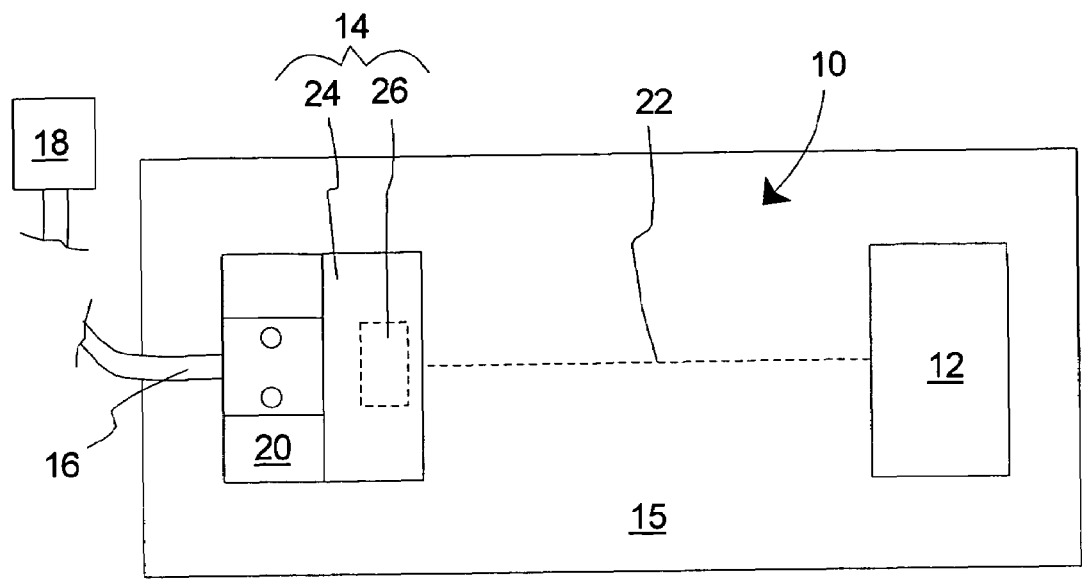
FIG. 1 is a simplified top plan view of a precision apparatus having features of the present invention.

Referring to FIG. 1, the present invention is directed to a precision apparatus 10 that, for example, can be used as or in manufacturing, optical communications, technical or scientific instruments. The design and orientation of the components of the precision apparatus 10 can be changed to suit the requirements of the precision apparatus 10. FIG. 1 is a simplified, non-exclusive top view of one embodiment of the precision apparatus 10. In this embodiment, the precision apparatus 10 includes a beam source 12, an optical assembly 14, an apparatus base 15, an optical fiber assembly 16, a beam sensor 18, and a fiber clamp 20. However, one or more of these components can be optional.

The beam source 12 generates a beam 22 (illustrated in phantom) of light energy that is directed at the optical assembly 14. In one embodiment, the beam source 12 is a laser source and the beam 22 is a small diameter optical beam.

The optical assembly 14 is positioned in the path of the beam 22 and focuses the beam 22. In one embodiment, the optical assembly 14 includes an assembly housing 24 and an optical element 26 (illustrated in phantom) that is retained by the assembly housing 24. As non-exclusive examples, the optical element 26 can be a fiber lens, a ball lens, aspherical lens, a focusing mirror, or another type of lens.

The apparatus base 15 retains some of the other components of the precision apparatus 10. In one embodiment, the apparatus base 15 is a generally rigid plate.

The optical fiber assembly 16 launches or collects a beam of light energy. In FIG. 1, the optical fiber assembly 16 collects the beam 22 that passes through the optical assembly 14 and transfers the beam 22 to the beam sensor 18. Alternatively, the precision apparatus 10 could be designed so that the optical fiber assembly 16 launches a beam of light energy or the precision apparatus 10 could be designed without an optical assembly 14. In one embodiment, the optical fiber assembly 16 includes a thin strand of transparent material that carries optical signals that can be made of glass and plastic.

The beam sensor 18 receives the beam collected by the optical fiber assembly 16 and measures the amount of light energy received.

The fiber clamp 20 clamps, holds and retains the optical fiber assembly 16. As an overview, in certain embodiments, the fiber clamp 20 retains the optical fiber assembly 16 in a fashion that applies a substantially uniform, repeatable, controlled force in magnitude and direction across the optical fiber assembly 16. The fiber clamp 20 is shaped to provide controlled force in magnitude and direction, even if the fiber tip is irregular in shape.

In one embodiment, the fiber clamp 20 is bolted to the optical assembly 14.

Figure 2A:
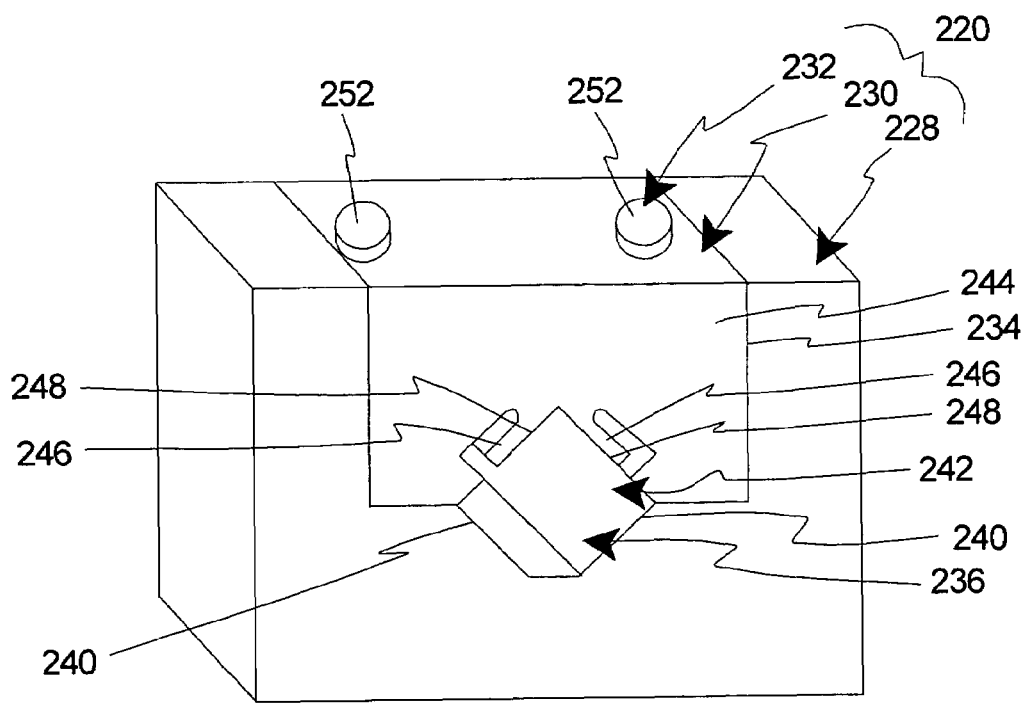
FIG. 2A is a simplified perspective view of a fiber clamp having features of the present invention.
Figure 2B:
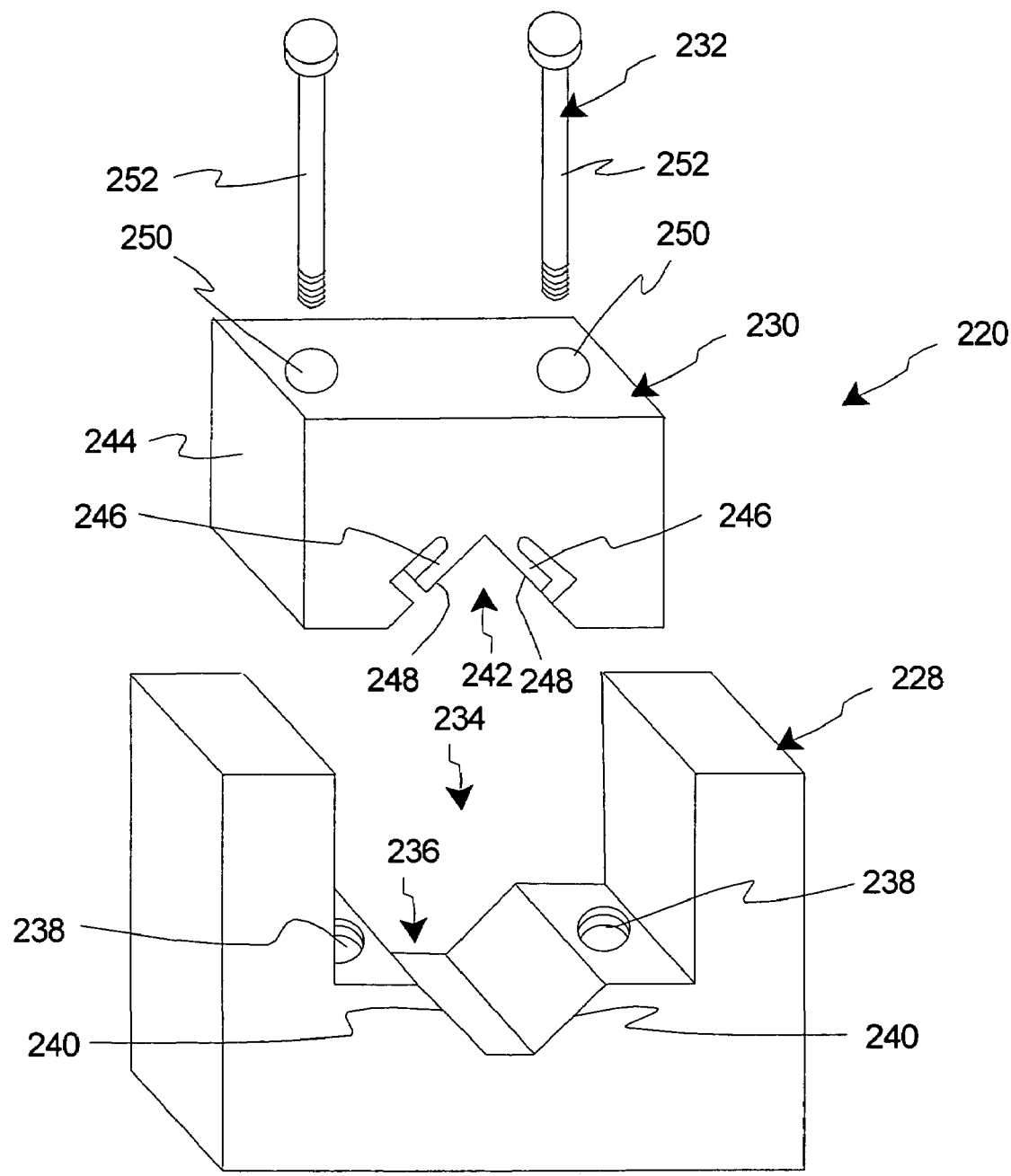
FIG. 2B is an exploded perspective view of the fiber clamp of FIG. 2A.

FIG. 2A is a simplified perspective view and FIG. 2B is an exploded perspective view of one embodiment of the fiber clamp 220. In this embodiment, the fiber clamp 220 includes a first clamp section 228, a second clamp section 230, and a fastener assembly 232. The design, size and shape of these components can be varied to suit the design requirements of the fiber clamp 220. In FIGS. 2A and 2B, the first clamp section 228 is below the second clamp section 230 and is secured to the apparatus base 15 (illustrated in FIG. 1). Alternatively, for example, the clamp sections 228, 230 can be reversed and/or the shape and functions of the clamp sections 228, 230 can be reversed.

The first clamp section 228 is generally rectangular block shaped and includes a generally rectangular shaped first channel 234 for receiving the second clamp section 230. A bottom of the first channel 234 includes a first groove 236 that receives a portion of the optical fiber assembly 16 (illustrated in FIG. 1) and a pair of spaced apart threaded apertures 238 for receiving a portion of the fastener assembly 232. In FIGS. 2A, 2B, the groove 236 is generally Vee shaped and includes a pair of opposed first clamping surfaces 240 that engage the optical fiber assembly 16. Alternatively, for example, the groove 236 could have curved sides to further minimize contact stresses between the optical fiber assembly 16 and the walls of the groove 236.

The second clamp section 230 flexibly urges the optical fiber assembly 16 against the first clamp section 228. The second clamp section 230 is generally rectangular block shaped and is sized and shaped to fit in the first channel 234 of the first clamp section 228. In FIGS. 2A and 2B, the bottom of the second clamp section 230 also defines a generally Vee shaped second groove 242. Further, the second clamp section 230 includes a section housing 244 and a pair of spaced apart flexible members 246 that extend away from the section housing 244 and engage the optical fiber assembly 16 and urge the optical fiber assembly 16 against the first clamp section 228.

In one embodiment, the flexible members 246 define a portion of the second groove 242. The design of the flexible members 246 can vary. For example, in one embodiment, each of the flexible members 246 is a relatively low stiffness flexural element. In one embodiment, each of the flexible members 246 is a generally rectangular shaped spring that cantilevers away from the section housing 244 and that forms part of the second groove 242. In this embodiment, each flexible member 246 defines a second clamping surface 248 that engages the optical fiber assembly 16. Alternatively, for example, each of the flexible members 246 can be a coil spring, a piece of elastic material, or another flexible material that engages the optical fiber assembly 16. In certain embodiments, the flexible members 246 need to behave in a manner that the stress-strain curve stays constant so that the clamping pressure will stay constant over time, temperature, and vibration.

In yet another embodiment, the second clamp section 230 could include a monolithic spring that is constrained at both ends and that contacts the optical fiber assembly 16 near the middle of the optical fiber assembly 16. The monolithic spring could be used instead of the flexible members 246.

With these designs, the flexible members 246 allow for deformation relative to the second clamp section 230. It should be noted that in certain embodiments, the amount of force across the optical fiber assembly 16 can be precisely controlled and programmed by adjusting the thickness, or the stiffness of the flexible members 246. With this design, the magnitude and direction of the forces applied to the optical fiber assembly 16 can be controlled and optimized. This can be a key piece of not changing the PER.

In one embodiment, the flexible members 246 are integrally formed with the section housing 244. Alternatively, the flexible members 246 can be attached to the section housing 244 during manufacturing.

Additionally, in FIGS. 2A and 2B, the second clamp section 230 includes a pair of spaced apart pass-thru apertures 250 that receive a portion of the fastener assembly 232 for securing the second clamp section 230 to the first clamp section 228.

The material utilized in the first clamp section 228 and the second clamp section 230 can vary. Suitable materials include metals such as steel, aluminum, titanium, or other materials such as plastic or ceramics.

The fastener assembly 232 selectively secures the second clamp section 230 to the first clamp section 228 and urges the clamp sections 228, 230 together. The design of the fastener assembly 232 can vary. In FIGS. 2A and 2B, the fastener assembly 232 includes a pair of spaced apart bolts 252 that extend through the pass thru apertures 250 in the second clamp section 230 and thread into the threaded apertures 238 in the first clamp section 228 to selectively urge the clamp sections 228, 230 together. Alternatively, for example, the fastener assembly 232 can include one or more threaded rods and corresponding nuts, an adhesive, and/or one or more latches. In yet another embodiment, the fastener assembly 232 can include one or more magnets.

It should be noted that in this embodiment, the fastener assembly 232 urges the clamp sections 228, 230 together, and that the bottom of the section housing 244 of the second clamp section 230 directly engages the first clamp section 228. With the present design, if the two clamp sections 228, 230 are fully in contact, any variation in applied torque to the bolts 252 of the fastener assembly 232 does not directly vary the applied clamp force applied to the optical fiber assembly 16.

Figure 3:
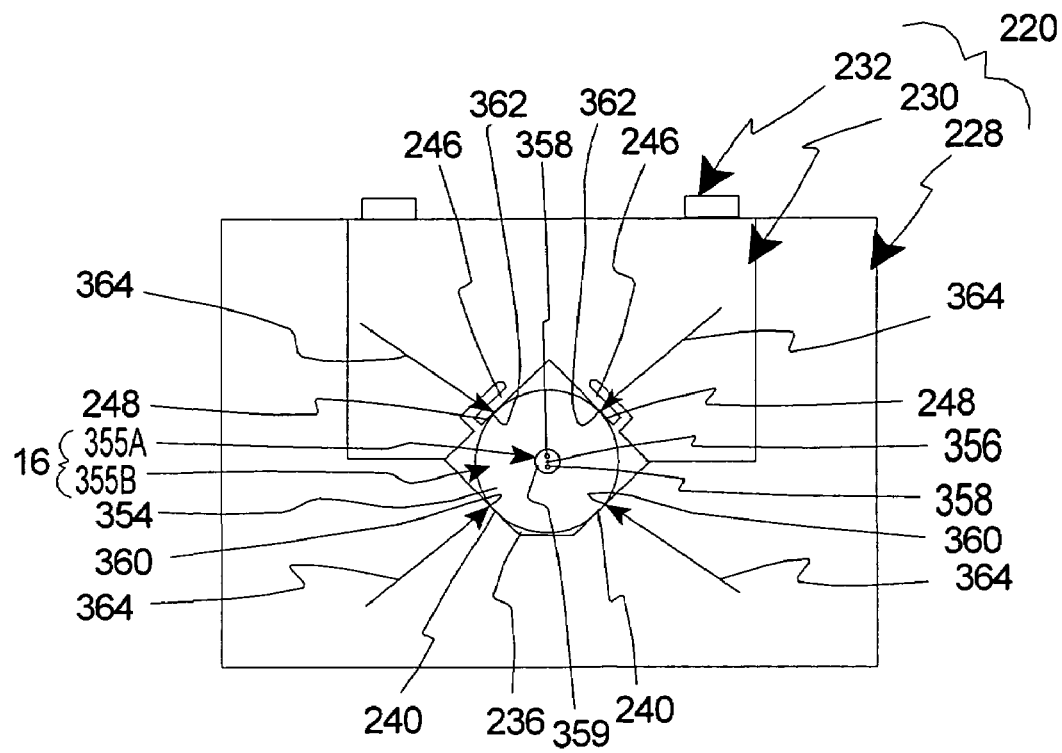
FIG. 3 is a simplified illustration of the fiber clamp and a portion of an optical fiber assembly having features of the present invention and FIG. 4 is simplified illustration of another embodiment of the fiber clamp and the optical fiber assembly.

FIG. 3 is a simplified illustration of the fiber clamp 220 and a distal fiber tip 354 of the optical fiber assembly 16. In this embodiment, the optical fiber assembly 16 includes an optical fiber 355A and a fiber ferrule 355B. In this embodiment, the optical fiber 355A includes (i) a core 356, e.g. a thin strand of transparent material that carries optical signals that can be made of glass and plastic, (ii) a pair of stress rods 358 that extend parallel to the core 356, and (iii) a fiber cladding 359 that encloses the core 356 and the stress rods 358, the fiber cladding 359 providing a protective and/or insulating layer. The fiber ferrule 355B is tubular and encircles the optical fiber 355A. In certain embodiments, the fiber ferrule 355B is only as long as the width of the fiber clamp 220. Alternatively, the optical fiber assembly 16 can have another design.

FIG. 3 illustrates that the distal fiber tip 354 is directly positioned between the first clamp section 228 and the second clamp section 230. More specifically, the optical fiber assembly 16 is positioned in the first groove 236 of the first clamp section 228, and the optical fiber assembly 16 is flexibly urged into the first groove from above by the flexible members 246 of the second clamp section 230. Further, FIG. 3 illustrates that the first clamp section 228 engages the optical fiber assembly 16 at two spaced apart first locations 360 (illustrated as arrows) and the second clamp section 230 engages the optical fiber assembly 16 at two spaced apart locations 362 (illustrated as arrows).

With this design, in certain embodiments, the first clamp section 228 and the second clamp section 230 cooperate to impart a plurality of spaced apart, substantially radially directed forces 364 (illustrated as arrows) on the optical fiber assembly 16. For example, in FIG. 3, the clamp sections 228, 230 cooperate to impart at least four radially directed forces 364 on the optical fiber assembly 16. Stated in another fashion, the radially directed forces 364 are directed perpendicular to the optical fiber assembly 16 and are directed from the outer perimeter towards the core 356.

Additionally, in FIG. 3, the four forces 364 are symmetrically spaced apart and oriented relative to the optical fiber assembly 16. Further, the four forces 364 define two orthogonal opposing radial force pairs. In one embodiment, the optical fiber assembly 16 is positioned in the fiber clamp 220 so that the orthogonal opposing radial force pairs are oriented with respect to the stress rods 358 and the core 356.

In this embodiment, the optical fiber assembly 16 is clamped into the first groove 230 by the two deflected cantilevered flexible members 246. Each of the flexible members 246 acts radially on the fiber tip 354 in a manner to push it against the first clamp section 228. The parts are designed and manufactured so that the second clamp section 230 directly engages the first clamp section 228 when bolted together with the fastener assembly 232 and the flexible members 246 deflect a predictable amount thereby applying a predictable force to the fiber tip 354.

In one embodiment, the fiber clamp 220 serves to directly constrain the fiber tip 354 in four degrees of freedom. The two remaining degrees of freedom, e.g. translation along the fiber tip 354 and rotation about the fiber tip 354 are addressed by friction forces generated by the contact normal forces and coefficient of friction between the fiber tip 354 and clamping surfaces 240, 248.

In certain embodiments, the components of the fiber clamp 220 cooperate to apply substantially uniform and precise forces to the optical fiber assembly 16 without requiring extreme mechanical precision and without damaging the optical fiber assembly 16. For example, in alternative, non-exclusive embodiments, the clamp sections 228, 230 can cooperate to apply four forces 364 that each have a value of between approximately 1 and 100 lbf, between approximately 20 and 80 lbf, between approximately 30 and 70 lbf, or between approximately 40 and 60 lbf to the optical fiber assembly 16. Stated in another fashion, in alternative, non-exclusive embodiments, the clamp sections 228, 230 can cooperate to apply four forces 364 that each have a value of approximately 5, 10, 20, 30, 40, 50, 60, 70, 80, 90, 100, 110, or 120 lbf to the optical fiber assembly 16.

It should be noted that the flexible members 246 allows for some compliance between the clamp sections 228, 230. The fastener assembly 232 is designed such that when the clamp sections 228, 230 are urged together, the compliant flexible members 246 displace a predetermined amount thereby applying a predetermined and even force on the optical fiber assembly 16. It should be noted that in certain embodiments, with the present invention, the fiber clamp 220 can be used to precisely control (via design) the amount of force applied to the optical fiber assembly 16.

Figure 4:
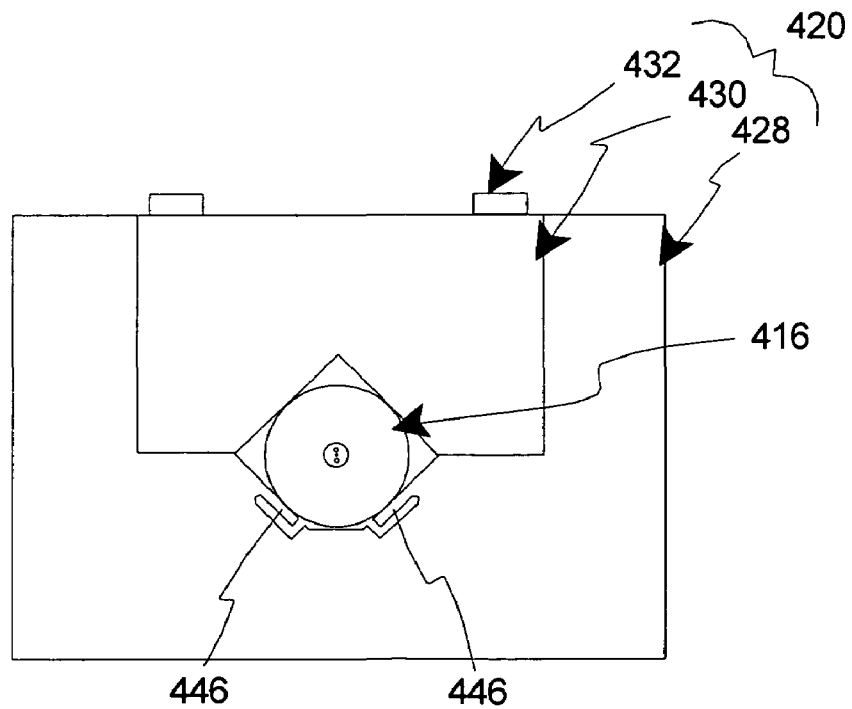

FIG. 4 is simplified illustration of another embodiment of the fiber clamp 420 that includes a first clamp section 428, a second clamp section 430, and a fastener assembly 432 that are somewhat similar to the corresponding components described above and an optical fiber assembly 416. However, in this embodiment, the flexible members 446 are part of the first clamp section 428 instead of the second clamp section 430.

Figure 5:
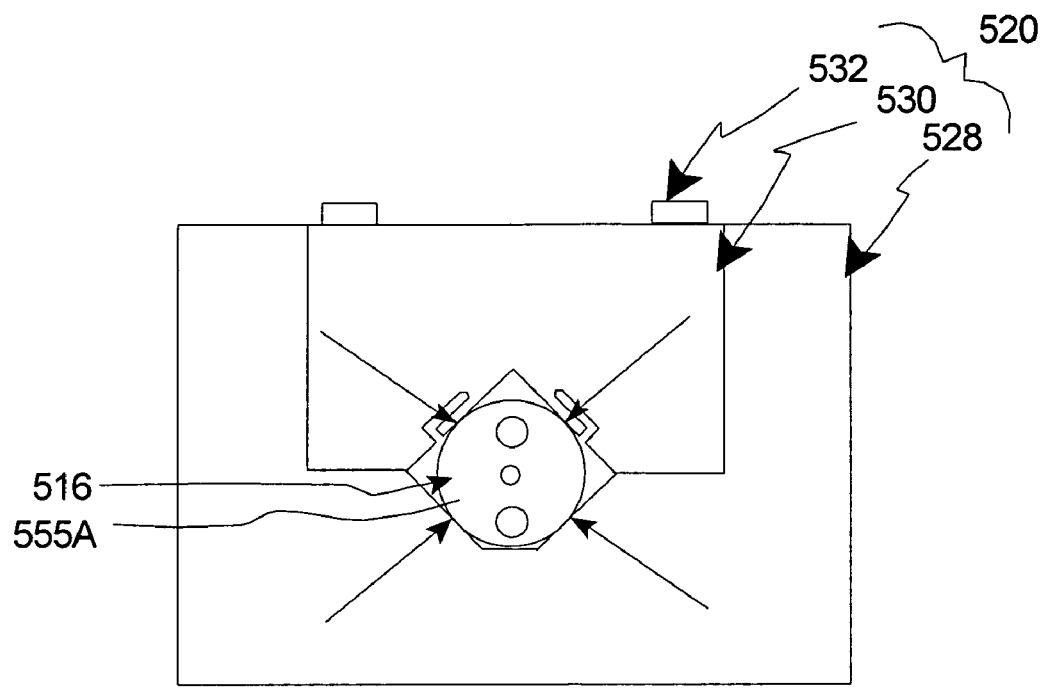
FIG. 5 is a simplified illustration of still another embodiment of the fiber clamp and the optical fiber assembly having features of the present invention.

FIG. 5 is simplified illustration of yet another embodiment of the fiber clamp 520 that includes a first clamp section 528, a second clamp section 530, and a fastener assembly 532 that are somewhat similar to the corresponding components described above and an optical fiber assembly 516. In this embodiment, the optical fiber assembly 516 does not include the fiber ferrule (not shown in FIG. 5). With this design, the fiber clamp 520 directly engages the optical fiber 555A.

Figure 6:
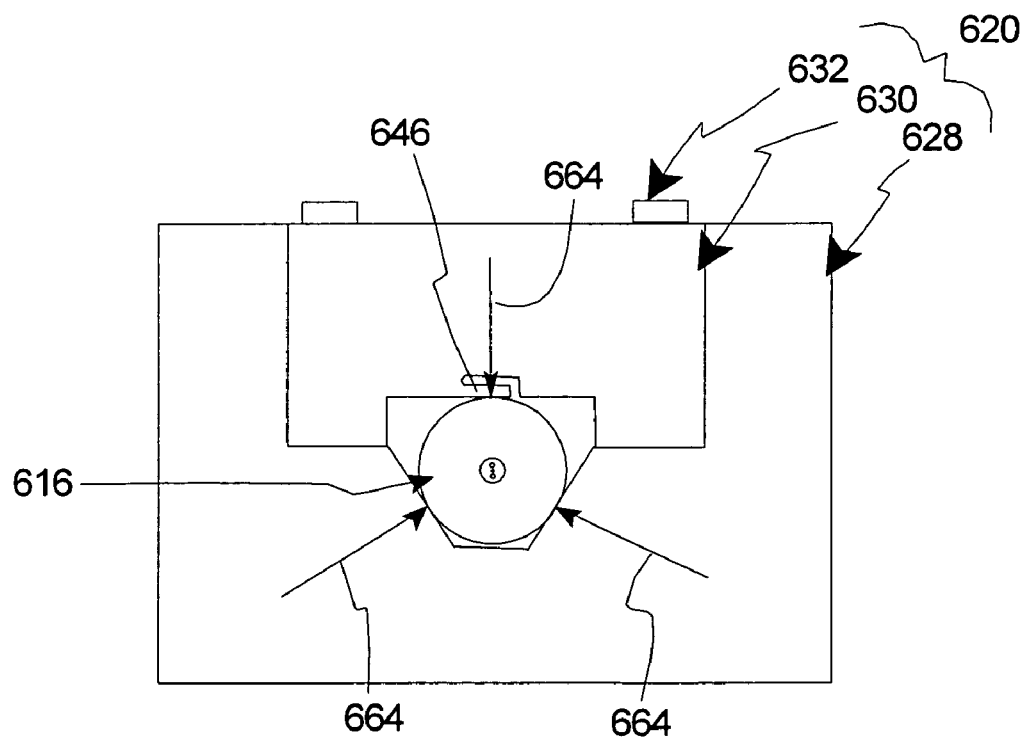
FIG. 6 is simplified illustration of yet another embodiment of the fiber clamp and the optical fiber assembly.

FIG. 6 is simplified illustration of yet another embodiment of the fiber clamp 620 that includes a first clamp section 628, a second clamp section 630, and a fastener assembly 632 that are somewhat similar to the corresponding components described above and an optical fiber assembly 616. However, in this embodiment, the second clamp section 630 includes only one flexible member 646. With this design, the clamp sections 628, 630 cooperate to impart three spaced apart, substantially radially directed forces 664 (illustrated as arrows) on the optical fiber assembly 616.

While the particular apparatus 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A fiber clamp for clamping an optical fiber assembly, the fiber clamp comprising:
   a first clamp section; and
   a second clamp section that flexibly urges the optical fiber assembly against the first clamp section, the second clamp section including a section housing and a pair of spaced apart flexible members that cantilever away from the section housing; wherein the first clamp section and the second clamp section cooperate to impart four radially directed forces that are symmetrically spaced apart circumferentially about the optical fiber assembly so as to constrain movement of the optical fiber assembly; and wherein the flexible members flexibly urge the optical fiber assembly against the first clamp section.

2. The fiber clamp of claim 1 wherein each of the flexible members includes an elastic member.

3. The fiber clamp of claim 1 further comprising a fastener assembly that selectively urges the second clamp section against the first clamp section.

4. The fiber clamp of claim 3 wherein the fastener assembly urges the section housing into contact with the first clamp section so that any variation in applied torque to the fastener assembly does not directly vary the applied clamp force applied to the optical fiber assembly.

5. The fiber clamp of claim 3 wherein the fastener assembly includes a pair of spaced apart bolts that secure the second clamp section to the first clamp section, and wherein the flexible members are positioned between the bolts.

6. The fiber clamp of claim 1 wherein the first clamp section includes a groove for receiving a portion of the optical fiber assembly.

7. The fiber clamp of claim 6 wherein the groove is somewhat vee shaped.

8. The fiber clamp of claim 1 wherein each of the clamp sections engages the optical fiber assembly at only two spaced apart locations.

9. A precision apparatus including an optical element, an optical fiber assembly, and the fiber clamp of claim 1 retaining the optical fiber.

10. A fiber clamp for clamping an optical fiber assembly, the fiber clamp comprising:
   a first clamp section;
   a second clamp section that flexibly urges the optical fiber assembly against the first clamp section, the second clamp section including a section housing and a pair of spaced apart elastic, flexible members that cantilever away from the section housing; wherein the first clamp section and the second clamp section cooperate to impart four radially directed forces that are symmetrically spaced apart circumferentially about the optical fiber assembly so as to constrain movement of the optical fiber assembly; wherein the spaced apart forces define two opposing radial force pairs that are orthogonally oriented; and wherein the flexible members flexibly urge the optical fiber assembly against the first clamp section; and
   a fastener assembly that urges the section housing directly into contact with the first clamp section so that any variation in applied torque to the fastener assembly does not directly vary the applied clamp force applied to the optical fiber assembly.

11. The fiber clamp of claim 10 wherein the first clamp section includes a groove for receiving a portion of the optical fiber assembly.

12. The fiber clamp of claim 11 wherein the groove is somewhat vee shaped.

13. The fiber clamp of claim 10 wherein each clamp section engages the optical fiber assembly at two spaced apart locations.

14. The fiber clamp of claim 10 wherein each of the clamp sections engages the optical fiber assembly at only two spaced apart locations.

15. The fiber clamp of claim 10 wherein the fastener assembly includes a pair of spaced apart bolts that secure the second clamp section to the first clamp section, and wherein the flexible members are positioned between the bolts.

16. A precision apparatus including an optical element, an optical fiber assembly, and the fiber clamp of claim 10 retaining the optical fiber.

17. A method for clamping an optical fiber assembly, the method comprising the steps of:
   providing a first clamp section; and
   flexibly urging the optical fiber assembly against the first clamp section with a second clamp section, the second clamp section including a section housing and a pair of spaced apart flexible members that cantilever away from the section housing and that flexible engage the optical fiber assembly; the first clamp section and the second clamp section cooperate to impart four radially directed forces that are symmetrically spaced apart circumferentially about the optical fiber assembly so as to constrain movement of the optical fiber assembly.

18. The method of claim 17 further comprising the step of urging the section housing against the first clamp section with a fastener assembly.

19. The method of claim 18 wherein the section housing directly contacts the first clamp section so that any variation in applied torque to the fastener assembly does not directly vary the applied clamp force applied to the optical fiber assembly.

20. The method of claim 17 wherein the step of providing a first clamp section includes providing a groove for receiving a portion of the optical fiber assembly.

21. The method of claim 17 wherein each clamp section engages the optical fiber assembly at two spaced apart locations.

22. The method of claim 17 wherein each of the clamp sections engages the optical fiber assembly at only two spaced apart locations.

* * * * *